(12) United States Patent
Stavely et al.

(10) Patent No.: US 7,194,701 B2
(45) Date of Patent: Mar. 20, 2007

(54) VIDEO THUMBNAIL

(75) Inventors: Donald J. Stavely, Windsor, CO (US);
Robert P. Cazier, Fort Collins, CO (US); Amy E. Battles, Windsor, CO (US); James W. Owens, Fort Collins, CO (US); James S. Voss, Fort Collins, CO (US); Dan L. Dalton, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1006 days.

(21) Appl. No.: 10/299,939

(22) Filed: Nov. 19, 2002

(65) Prior Publication Data

US 2004/0095396 A1   May 20, 2004

(51) Int. Cl.
*G06F 3/00* (2006.01)
(52) U.S. Cl. ...................................... 715/838
(58) Field of Classification Search ................ 715/838
See application file for complete search history.

(56) References Cited

U.S. PATENT DOCUMENTS

| | | | |
|---|---|---|---|
| 5,479,602 A | 12/1995 | Baecker et al. | |
| 5,715,416 A | 2/1998 | Baker | |
| 5,751,286 A * | 5/1998 | Barber et al. | 715/835 |
| 5,835,163 A | 11/1998 | Liou et al. | |
| 5,841,432 A | 11/1998 | Carmel et al. | |
| 5,936,638 A | 8/1999 | Hodgins et al. | |
| 5,966,122 A | 10/1999 | Itoh | |
| 5,966,131 A | 10/1999 | Marks | |
| 5,999,173 A | 12/1999 | Ubillos | |
| 6,002,401 A | 12/1999 | Baker | |
| 6,012,069 A * | 1/2000 | Shibazaki | 707/104.1 |
| 6,181,342 B1 | 1/2001 | Niblack | |
| 6,278,455 B1 | 8/2001 | Baker | |
| 6,285,381 B1 | 9/2001 | Sawano et al. | |
| 6,356,921 B1 | 3/2002 | Kumar et al. | |
| 6,357,042 B2 | 3/2002 | Srinivasan et al. | |
| 6,370,543 B2 | 4/2002 | Hoffert et al. | |
| 6,396,500 B1 | 5/2002 | Qureshi et al. | |
| 6,441,927 B1 | 8/2002 | Dow et al. | |
| 6,580,437 B1* | 6/2003 | Liou et al. | 715/719 |
| 6,847,388 B2* | 1/2005 | Anderson | 715/854 |
| 7,003,737 B2* | 2/2006 | Chiu et al. | 715/848 |
| 2001/0020981 A1* | 9/2001 | Jun et al. | 348/426.1 |
| 2002/0122073 A1 | 9/2002 | Abrams et al. | 345/838 |
| 2003/0146915 A1* | 8/2003 | Brook et al. | 345/473 |
| 2004/0001107 A1* | 1/2004 | Russon | 345/838 |
| 2004/0100506 A1* | 5/2004 | Shiota et al. | 345/838 |

* cited by examiner

*Primary Examiner*—Sy Luu
*Assistant Examiner*—Lê Nguyen

(57) ABSTRACT

A video thumbnail for use as an icon of a digital video file and method of generating same. The video thumbnail is preferably a relatively short, low resolution, animated video thumbnail. The video thumbnail is extracted from a preferred sequence of the video file and embedded as a header of the file. The video thumbnail preferably plays automatically, and acts as a pointer to the file and the preferred point within it.

31 Claims, 1 Drawing Sheet

VIDEO THUMBNAIL

TECHNICAL FIELD

The present invention relates generally to digital video, and more specifically, to an animated video thumbnail for use with digital video files and method of generating the thumbnail.

BACKGROUND

Digital video clips or files are an increasingly important form of image information. They are generated by digital cameras and camcorders, they are stored, manipulated, and viewed on personal computers and digital appliances, and they are transmitted over the Internet. Currently there is no good, visual, user-friendly representation for the contents of a digital video clip or file.

Digital still images have been represented by a thumbnail version of the image file. The thumbnail is low resolution, but often is sufficient for a user to recognize the content without opening the full resolution image. The thumbnail is originally generated by downsampling the full image. It is usually stored in a header of the image file so that it does not have to be regenerated for each use. It can be physically separated from the full-resolution image file, but remains logically connected by way of a pointer or address.

To date, digital cameras have used a thumbnail of the first frame of a digital video clip to represent the clip, perhaps overlaying a graphical icon to indicate it is video. This has the disadvantage that it is static, and it rarely shows the actual event for which the video clip was taken. For example, the video clip might be of a child scoring a touchdown. The first frame of the clip may be of the huddle, which is not a visually-obvious reminder of the event Prior art relating to the present invention is as follows.

U.S. Pat. No. 5,999,173 discloses a "method and apparatus, in which video clips (and optionally also still image and audio clips) are stored as digital data in a computer memory, selected clips are displayed in elongated tracks on a display screen, and editing operations are performed on the clips in response to manipulation of displayed cursors and icons to assemble and preview an edited video program." "The system assembles a video program from stored clips in response to arrangement of displayed clips and special effect icons in a desired sequence along the time line. The computer system is preferably programmed: to select a new in or out point for a clip by positioning a cursor at an edge of the displayed clip and dragging the edge relative to the time line, to select a special effect transition between displayed clips by positioning a transition icon in a special track in alignment with overlapping portions of the clips, to select special effect parameters by manipulating an icon in a special effects track, to filter selected video clips with a mosaic filter having user-selectable time-varying filter characteristics, and to control superimposition of an overlay clip with a main clip in response to manipulation of a level control icon displayed in alignment with the overlay clip." U.S. Pat. No. 5,999,173 discloses that "Animated "special effect" icons, each representing a special effect, are displayed in a separate special effects track also oriented parallel to the time ruler. Each special effect icon can represent a special effect transition between two clips (such as a dissolve, fade, and wipe)."

U.S. Pat. No. 6,356,921 discloses a "Framework for progressive hierarchical and adaptive delivery rich media presentations and associated meta data." U.S. Pat. No. 6,356,921 discloses that a "single file contains all information for a complete presentation. Each presentation file contains both data and software for the presentation. It includes both the data and software provided to the user and that retained by the server for the performance of the presentation. The basic building block for a presentation is a frame. The presentation file can contain a file header frame and multiple media frames, and one or more meta data frame. Of the frame types, the file header frame is the only one whose presence is mandatory in the presentation file format. The file header frame identifies the subject matter and contents of the presentation file providing information on the media types and total length of the file. The most degenerate yet useful version of a presentation file would have the file header frame followed by a media frame containing a thumbnail description. A thumbnail description may constitute a simple still picture or written description of the subject matter. Other media frames can be animated or full motion descriptions of the subject matter. Meta data frames are frames that contain non-media specific data file level behavior and user information. Meta data frames are presented only in cases where non-fault behavior and configuration are desired or in cases where actions and abstract navigational semantics are to be incorporated."

U.S. Pat. No. 5,841,432 discloses a "A compressed data file for real time display of multimedia applications, e.g., animation, on a network is disclosed. The file includes general information about the animation. Also included in the file are complete segment blocks of information representing single frames in the animation. Each frame is made up of multiple images (layers) which are overlapped. Each image is made up of vector objects. Display of the file is conducted through asynchronous transfer of data so that as a frame is displayed, the next frame is transmitted and received by an end user for immediate display."

U.S. Pat. No. 5,715,416 discloses a "pictorial user interface for accessing information in an electronic file system provides a pictorial image which is linked to a file directory and which identifies the file directory. Objects in the pictorial image are icons linked to file objects and an animated character is overlaid on the pictorial image. User input causes movement of the animated character relative to the pictorial image. Input from the user is preferably through a limited input device such as a gamepad controller, a mouse, or by using a limited number of keys on a normal keyboard. Input signals are mapped according to keycode identical command sets, context arguments and selection arguments. Commands that can be invoked by the user include operating system commands, pictorial object commands, and interface utility commands. Using the pictorial object commands, the user can configure the interface so that different pictures and icons are associated with different directories and files. Commands are executed with a prologue animation and an epilogue animation. The prologue animation provides feedback as to the nature of the command being executed. The epilogue animation provides feedback as to the results of the command. Animations may include actions of the animated character or the behaviour of a selected icon, or both. The interface may be applied as an overlay to virtually any operating system."

U.S. Pat. No. 5,835,163 discloses "Apparatus for detecting a cut in a video comprises arrangements for acquiring video images from a source, for deriving from the video images a pixel-based difference metric, for deriving from the video images a distribution-based difference metric, and for measuring video content of the video images to provide up-to-date test criteria. Arrangements are included for combining the pixel-based difference metric and the distribution-based difference metric, taking into account the up-to-date test criteria provided so as to derive a scene change candidate signal and for filtering the scene change candidate signal so as to generate a scene change frame list."

U.S. Pat. No. 5,936,638 discloses "system generates and arranges animation sequences of articulated characters for review and selection by a user. Motion of articulated characters is based upon input parameters, such as torques at joints of the character. The system can be used to select appropriate parameters to obtain desirable motion of the articulated characters. The system generates a set of input vectors containing parameters of the motion. The input parameters are then processed to determine animation sequences and corresponding output vectors. The output vectors include characteristics of the motion. The input vectors are selected to provide a dispersed set of output vectors. A large number of random input vectors can be generated and then culled to leave a dispersed set of output vectors. Alternatively, a set of randomly generated input vectors of a predetermined size are randomly perturbed, to further disperse the output vectors. The system includes an interface for representing the output vectors and animation sequences in a manner which is easily reviewable by a user. The output vectors are displayed so that positions represent distances between the output vectors. The user can then select specific output vectors so that the corresponding animation sequence is displayed."

U.S. Pat. No. 5,966,122 discloses an "electronic camera displays thumbnails corresponding to source files such as motion picture image files in one window. An operator intuitively performs simple operations on the thumbnails displayed in the window and corresponding source files by selecting, editing and rearranging the thumbnails within the window using drag and drop operations and a menu containing editing options. The operator can use a mouse or a touch screen to perform the drag and drop operations and to select editing options from the menu."

U.S. Pat. No. 5,966,131 discloses a "system for generating a set of graphical images based upon application of different graphical transfer functions to data of physical structures in a scene. The application of the different graphical transfer functions define graphical images of a single scene having different characteristics. A user can then review the images to select a desirable image, without having to define or know the graphical transfer function which generates the image. The system of the present invention generates a dispersed set of output vectors representing characteristics of the set of images based upon a transfer function. The system creates the dispersed set by generating a random set of output vectors and then randomly perturbing one. The perturbed vector replaces one of the other vectors if the replacement results in a more dispersed set. The process is repeated until a thoroughly dispersed set of output vectors has been obtained. The dispersion of the set is determined based upon a total number of iterations or a number of perturbations without replacement. The output vectors are created by randomly selecting sets of parameters of the graphical transfer function as input vectors, and generating the images based upon the input vectors. The output vectors are similarly perturbed by randomly perturbing at least one parameter of a randomly selected input vector, and determining the corresponding new output vector."

U.S. Pat. No. 6,002,401 discloses a "pictorial user interface for accessing information in an electronic file system provides a pictorial image which is linked to a file directory and which identifies the file directory. Objects in the pictorial image are icons linked to file objects and an animated character is overlaid on the pictorial image. User input causes movement of the animated character relative to the pictorial image. Input from the user is preferably through a limited input device such as a gamepad controller, a mouse, or by using a limited number of keys on a normal keyboard. Input signals are mapped according to keycode identical command sets, context arguments and selection arguments. Commands that can be invoked by the user include operating system commands, pictorial object commands, and interface utility commands. Using the pictorial object commands, the user can configure the interface so that different pictures and icons are associated with different directories and files. Commands are executed with a prologue animation and an epilogue animation. The prologue animation provides feedback as to the nature of the command being executed. The epilogue animation provides feedback as to the results of the command. Animations may include actions of the animated character or the behavior of a selected icon, or both. The interface may be applied as an overlay to virtually any operating system."

U.S. Pat. No. 6,278,455 discloses a "pictorial user interface for accessing information in an electronic file system provides a pictorial image which is linked to a file directory and which identifies the file directory. Objects in the pictorial image are icons linked to file objects and an animated character is overlaid on the pictorial image. User input causes movement of the animated character relative to the pictorial image. Input from the user is preferably through a limited input device such as a gamepad controller, a mouse, or by using a limited number of keys on a normal keyboard. Input signals are mapped according to keycode identical command sets, context arguments and selection arguments. Commands that can be invoked by the user include operating system commands, pictorial object commands, and interface utility commands. Using the pictorial object commands, the user can configure the interface so that different pictures and icons are associated with different directories and files. Commands are executed with a prologue animation and an epilogue animation. The prologue animation provides feedback as to the nature of the command being executed. The epilogue animation provides feedback as to the results of the command. Animations may include actions of the animated character or the behaviour of a selected icon, or both. The interface may be applied as an overlay to virtually any operating system."

U.S. Pat. No. 6,181,342 discloses a "graphical user interface to desktop documents presents a visual display of visual summaries extracted from still image files, video image files, presentation slide documents, and word processing documents that include figures therein, in a computer file system, in response to a computer user requesting a directory listing. The user can select a visual summary to cause the computer to search for files/documents containing similar images. The visual summaries can be presented in a hierarchy, with the top level of the hierarchy containing one visual summary per file/document, the next level containing visual summaries of all images in each file/document, and the lowest level containing visual summaries of each individual component, if any, in each image in a document. Further, for an alphanumeric document having no images, the corresponding visual summary can be a visual representation of the appearance of a portion of the document, such as a portion of the first page of the document."

U.S. Pat. No. 6,285,381 discloses a "frame of still picture data is captured at an instant specified by a user from video signals supplied from a given video source, such as a television receiver, a video camera, etc., and the image data is displayed. When the user specifies an area of image to be cut out from the displayed still picture, the image data in the specified area is cut out and recorded as a cutout image. Each cutout image recorded is displayed in the form of an icon. When any of the icons is selected by the user, the corresponding cutout image data is read and pasted in a part to be changed in the original image data. Thus an image can be easily created by user's choice."

U.S. Pat. No. 6,357,042 discloses an "authoring system for interactive video has two or more authoring stations for providing authored metadata to be related to a main video data stream and a multiplexer for relating authored metadata from the authoring sources to the main video data stream. The authoring stations annotate created metadata with presentation time stamps (PTS) from the main video stream, and the multiplexer relates the metadata to the main video stream by the PTS signatures. In analog streams PTS may be created and integrated. In some embodiments there may be multiple and cascaded systems, and some sources may be stored sources. Various methods are disclosed for monitoring and compensating time differences among sources to ensure time coordination in end product. In different embodiments transport of metadata to an end user station is provided by Internet streaming, VBI insertion or by Internet downloading. User equipment is enhanced with hardware and software to coordinate and present authored material with the main data stream."

U.S. Pat. No. 6,370,543 discloses a "method and apparatus for searching for multimedia files in a distributed database and for displaying results of the search based on the context and content of the multimedia files."

U.S. Pat. No. 6,396,500 discloses a "method and system for automatically translating slides in a slide presentation file into a series of corresponding slide HTML pages for displaying a slide show with a viewing facility such as a browser. An animated object is generated for each object in the HTML page that is related to an animation of the object in the corresponding slide created for presentation by the other facility. A queue is generated for defining the order and time line for the graphical display of each animated and non-animated object of each HTML page. The browser graphically displays the contents of each HTML page in accord with the order and time line defined by the queue so that a graphical display of the generated slide show is presented to the user in a manner that is related to the intended presentation by the other facility of the originally created slide show. Divisions in the HTML page are created with nested DIV tags so that percentages related to default dimensions in the HTML page may be used to define the dimensions of a display space for objects included in the HTML page. The objects may include text, movies, audio clips, animations, transitions, images, and image maps associated with hyperlinks. User interface controls are provided to select options for animating objects and transitions and automatically fitting the objects in the page to the size of the display."

U.S. Pat. No. 6,441,927 discloses an "appliance and method are provided for capturing and viewing images. The capturing and viewing appliance is an instrument used to capture and communicate images to other appliances and devices with communication capabilities. The capturing and viewing appliance includes a processor for manipulating and viewing the images on a built-in display. Program code stored in internal memory includes a viewing application program which allows the user to view stored images in a variety of pixel resolutions. According to another aspect of the invention, the viewing system provides a user-friendly interface for effective graphical communication of the functioning of the appliance or other device to the user through use of animated transitions. Through the use of metaphorical icons, animated transitions between exploded and unexploded images and image magnification, the present invention presents a novel user interface which makes the viewing system and method a solution to devices in need of image viewing capabilities with limited resources. The viewing method is designed for viewing captured images through instrument reuse especially useful in portable hand-held appliances or other devices which are capable of displaying images where space and compactness are a concern."

U.S. patent application 20020122073 discloses "methods, apparatuses and systems facilitating the creation, management and implementation of image histories associated with the use of telepresence systems. The present invention extends and enhances the capabilities of current telepresence systems for both users and systems administrators. Embodiments of the present invention enhance a user's ability to navigate a remote physical location by providing a visual representation of the user's session. One embodiment allows users to create visual bookmarks of a session. Other embodiments of the present invention facilitate monitoring and analysis of use of one or more telepresence systems."

U.S. Pat. No. 5,479,602 discloses a "means and method for generating and displaying a content based depiction of a standard icon on the display of a computer is described. The depiction is generated upon the occurrence of predetermined events, such as the closure of the document or file associated with the icon, and is displayed in either a static or animated form in place of the standard icon in response to selection signals from a selection device. A single content-based depiction of an icon is generated by creating a representation of the object (file or document) to be depicted, and translating this representation into a scaled-down replica of the representation. This representation may be in the form of a bit-map, a full-scale image, etc. The replica is created by partitioning the representation into a number of equal segments, measuring the percentages of different colors (black and white, gray scale, or color) within each segment, and assigning a single color value to each display element or pixel of the replica based upon the color percentage measured from each corresponding segment of the representation. Animated depictions are created by forming a number of different replicas for each representation to be depicted and then displaying those replicas in a serial sequence to create an animated depiction of the representation. Like the icons these depictions replace when selected, the depictions would be movable to any position on the display through use of the mouse."

U.S. Pat. No. 5,479,602 states in the Background section that "Animation in the prior art is implemented by displaying a series of fixed frames. Each frame depicts the icon image at some instant in time. These fixed frames are produced by either manually creating a plurality of fixed icon images in various stages of motion or by digitizing a number of frames from an analog clip of video. This latter process produces icon-like, or small window-sized, images generally known as "dicons" (dynamic icons) or "micons" (movie icons). Either process is typically time-consuming and generally requires expensive additional equipment and/ or software. Neither process is effective, nor suited, for depicting changes in the content of the object to be dynamically represented by the animated icon." The is the only discussion regarding "video" in U.S. Pat. No. 5,479,602. Thus, U.S. Pat. No. 5,479,602 teaches away from generating a sequence of frames to produce an animated icon and addresses icons that "depict changes in the content of the object to be dynamically represented by the animated icon."

However, none of the prior art references specifically discloses the use of a video thumbnail used as an icon of a digital video file that is extracted from a preferred sequence of frames of the video file. More particularly, none of the prior art references discloses that the sequence or series of preferred digital video frames are selected so that they easily remind a user of the key aspect of the digital video file.

Accordingly, it is an objective of the present invention to provide for a video thumbnail that for use as an icon of a digital video file that comprises a animated sequence of frames extracted from the video file, and that is extracted from a preferred sequence of frames of the video file. It is also an objective of the present invention to provide for a method of generating a video thumbnail of a digital video file.

SUMMARY OF THE INVENTION

To accomplish the above and other objectives, the present invention provides for a relatively short, low resolution, animated video thumbnail that is used as an icon of a digital video file. The video thumbnail is extracted from a preferred sequence of frames of the video file and embedded as a header of the file. The video thumbnail preferably plays automatically, and acts as a pointer to the file and the preferred point within it.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which.

DETAILED DESCRIPTION

Figure 1:
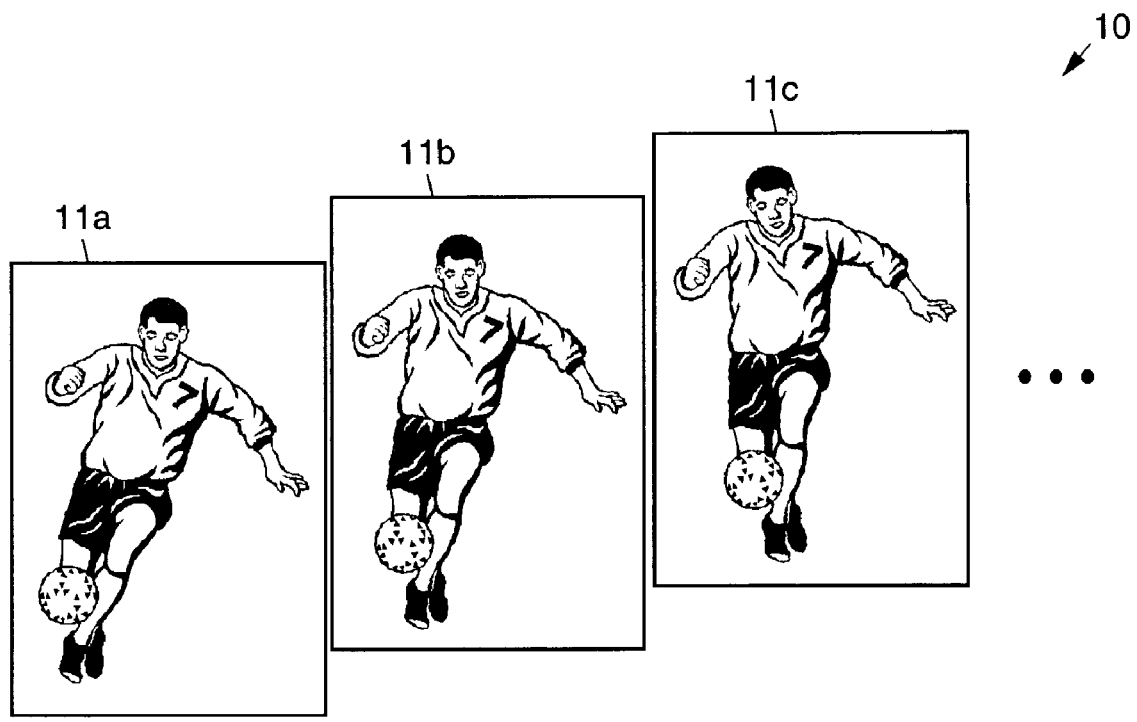
FIG. 1 illustrates an exemplary embodiment of a video thumbnail in accordance with the principles of the present invention.

Referring to the sole drawing figures, FIG. 1 illustrates an exemplary embodiment of a video thumbnail in accordance with the principles of the present invention. The video thumbnail comprises a relatively short, low resolution, animated video thumbnail that is used as an icon of a digital video file.

An exemplary video thumbnail comprises a plurality (sequence or series) of preferred digital video frames of the digital video file. The sequence or series of preferred digital video frames are selected to easily remind a user of the key aspect of the digital video file.

A first aspect of the present invention is that the video thumbnail representation of the video clip or file is animated. It shows a series of frames from the video file, preferably sampled at a low rate to minimize the storage requirements. The thumbnail plays automatically as appropriate for the application. For example, the thumbnail would play while scrolling through images on a digital camera. Pausing on the thumbnail causes it to replay continuously in a loop. On a multi-up screen presentation on a camera or personal computer, the thumbnail plays the animation when it is highlighted or "moused-over".

A second aspect of the present invention is that the thumbnail represents a significant or preferred segment of the video file, not just the first segment. In the example mentioned in the Background section, it would be the touchdown pass rather than the huddle. The preferred segment may be identified by the user, such as by sampling a few seconds on either side of a shutter press. It is possible to automatically identify a candidate segment, such as one with maximum activity. A default segment may be composed of sampled frames of a longer segment or of the whole file, so the animation is a "fast forward" view of the segment or of the whole video file.

Other aspects of the video thumbnail borrow from a still image thumbnail. It may be embedded in a header of the video file, so that it would not have to be regenerated when it was played. It may also be used separately as a pointer to the file, and perhaps to the preferred point within it. For example, a user could email the video thumbnail to a friend. When the friend clicked on the video thumbnail, it would download the full video clip or file from a server or take him or her to a website containing the full clip.

While the video thumbnail concept has value in a camera user interface, it is much more powerful when also integrated "downstream" into host software applications, websites, and the like. The video thumbnail may be a proprietary element of an integrated imaging "ecosystem" developed by the assignee of the present invention, or it may be the basis for a broader industry standard.

Figure 2:
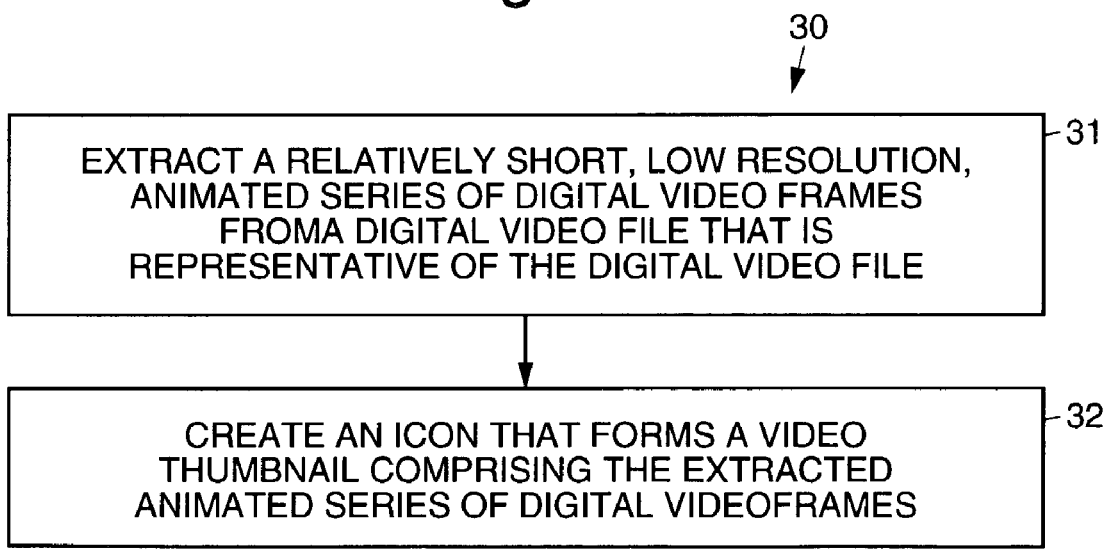
FIG. 2 illustrates an exemplary method in accordance with the principles of the present invention.

FIG. 2 illustrates an exemplary method 30 in accordance with the principles of the present invention. The exemplary method 30 generates a video thumbnail of a digital video file, and comprises the following steps. A relatively short, low resolution, animated series of digital video frames is extracted 31 from a digital video file that is representative of the digital video file. An icon is created 32 comprising the extracted animated series of digital video frames to provide a video thumbnail.

Thus, a video thumbnail for use as an icon of a digital video file and method of generating same have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A video thumbnail comprising: a low resolution, animated series of digital video frames extracted from a segment of a digital video file that comprises an icon that is representative of the digital video file.

2. The video thumbnail recited in claim 1 wherein the series of frames is sampled at a low rate to minimize storage requirements.

3. The video thumbnail recited in claim 1 which plays automatically when the icon is selected.

4. The video thumbnail recited in claim 1 which plays automatically when scrolling through images of a digital camera that recorded the digital video file.

5. The video thumbnail recited in claim 1 which plays automatically when scrolling through images of a video camcorder that recorded the digital video file.

6. The video thumbnail recited in claim 1 which plays automatically when scrolling through images of a digital image capture device that recorded the digital video file.

7. The video thumbnail recited in claim 1 which plays automatically when the icon is highlighted.

8. The video thumbnail recited in claim 1 which plays automatically when a mouse cursor is over the icon.

9. The video thumbnail recited in claim 1 wherein the thumbnail replays continuously while the icon is selected.

10. The video thumbnail recited in claim 1 wherein the series of digital video frames comprises a preferred segment of the digital video file.

11. The video thumbnail recited in claim 1 wherein the series of digital video frames comprises a relatively short time-lapse video thumbnail corresponding to a fast forward view of the entire digital video file.

12. The video thumbnail recited in claim 10 wherein the preferred segment is identified by a user by sampling a few seconds of the digital video file on either side of a shutter press or other means of selection.

13. The video thumbnail recited in claim 1 is embedded in a header of the digital video file.

14. The video thumbnail recited in claim 1 which comprises a pointer to the digital video file.

15. The video thumbnail recited in claim 14 wherein the pointer identifies a file on a remote computer or server.

16. The video thumbnail recited in claim 14 wherein the pointer is a URL or web address.

17. A method of generating a video thumbnail of a digital video file, comprising: extracting a low resolution, animated series of digital video frames from a segment of a digital video file to form an icon that is representative of the digital video file; and creating a video thumbnail comprising an animated series of the extracted digital video frames.

18. The method recited in claim 17 wherein the series of frames is sampled at a low rate to minimize storage requirements.

19. The method recited in claim 17 wherein the series of frames plays automatically when the icon is selected.

20. The method recited in claim 17 wherein the series of frames plays automatically when scrolling through images of a digital camera that recorded the digital video file.

21. The method recited in claim 17 wherein the series of frames plays automatically when scrolling through images of a video camcorder that recorded the digital video file.

22. The method recited in claim 17 wherein the series of frames plays automatically when scrolling through images of a digital image capture device that recorded the digital video file.

23. The method recited in claim 17 wherein the series of frames plays automatically when the icon is highlighted.

24. The method recited in claim 17 wherein the thumbnail replays continuously while the icon is selected.

25. The method recited in claim 17 wherein the thumbnail comprises a relatively short time-lapse video thumbnail of the entire digital video file compressed in time.

26. The method recited in claim 18 wherein the series of digital video frames comprises a preferred segment of the digital video file.

27. The method recited in claim 26 wherein the preferred segment is identified by a user by sampling a few seconds of the digital video file on either side of a selection event.

28. The method recited in claim 17 wherein the thumbnail is embedded in a header of the digital video file.

29. The method recited in claim 17 wherein the thumbnail comprises a pointer to the digital video file.

30. The method recited in claim 29 wherein the pointer identifies a file on a remote computer or server.

31. The method recited in claim 29 wherein the pointer is a URL or web address.

* * * * *